Figure 1:
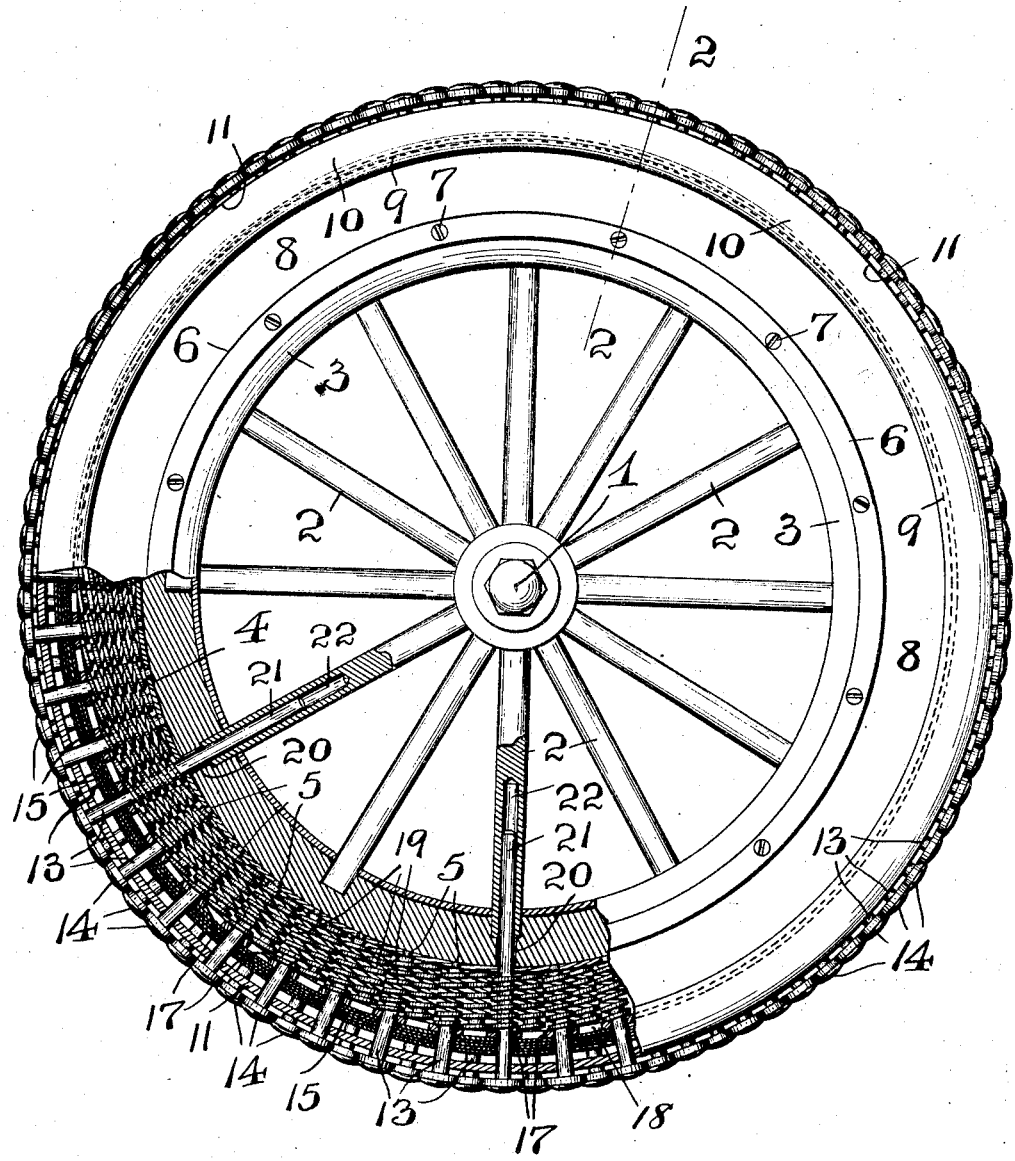

R. REININGER.
VEHICLE WHEEL.
APPLICATION FILED APR. 5, 1910.

989,049.

Patented Apr. 11, 1911.
2 SHEETS—SHEET 1.

WITNESSES:
Fred'k W. Fraentzel.
Anna H. Alter.

INVENTOR:
Richard Reininger,
BY
Fraentzel and Richards,
ATTORNEYS

R. REININGER.
VEHICLE WHEEL.
APPLICATION FILED APR. 5, 1910.
989,049.
Patented Apr. 11, 1911.
2 SHEETS—SHEET 2.
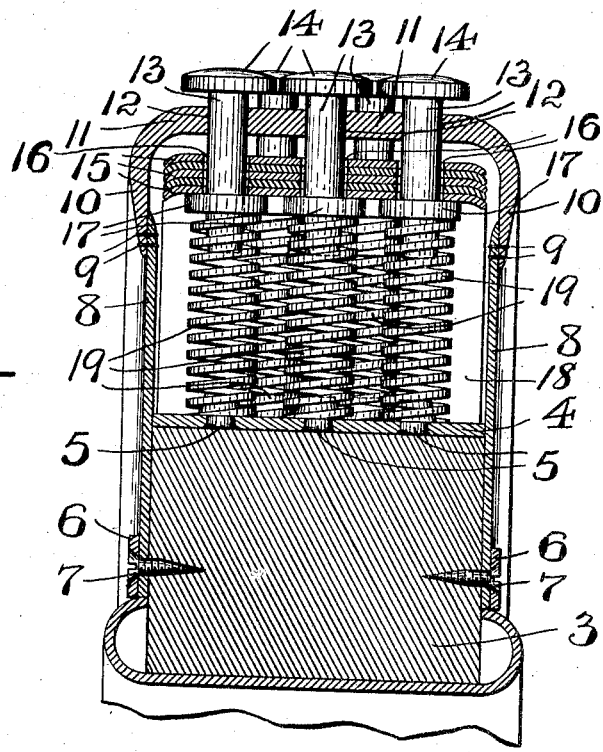

UNITED STATES PATENT OFFICE.

RICHARD REININGER, OF NEWARK, NEW JERSEY.

VEHICLE-WHEEL.

989,049.

Specification of Letters Patent. Patented Apr. 11, 1911.

Application filed April 5, 1910. Serial No. 553,639.

*To all whom it may concern:*

Be it known that I, RICHARD REININGER, a citizen of the United States, residing at Newark, in the county of Essex and State of New Jersey, have invented certain new and useful Improvements in Vehicle-Wheels; and I do hereby declare the following to be a full, clear, and exact description of the invention, such as will enable others skilled in the art to which it appertains to make and use the same, reference being had to the accompanying drawings, and to characters of reference marked thereon, which form a part of this specification.
The present invention relates, generally, to improvements in resilient tires for vehicle wheels, with more particular reference to the adaptability of the said resilient tire to the wheels of automobiles and vehicles of a similar character; and, the invention has reference, more particularly, to a novel construction of tire possessing all the advantages, with none of the disadvantages, of the ordinary forms of pneumatic vehicle-tires now in use.

My invention, therefore, has for its principal object to provide a novel construction of resilient vehicle-tire of purely mechanical construction and operation in producing the resilient effects, the same being preferably elastic, durable and puncture-proof.

In vehicle-tires, as heretofore constructed, to produce a resilient effect by mechanical means, the greatest objection is found in the fact that the resiliency is not properly distributed throughout the tread of the tire, so that the tread of the tire can closely hug the surface of the road and at the same time yield to slight inequalities in the road-bed, such as small stones, and the like, at the point or points of the tread where such small inequalities make contact with the same.

This objection is entirely overcome in my novel construction of tire, and an important object of my invention is, therefore, to provide a resilient tire in which the resiliency is due to mechanical means, but which is arranged and constructed so as to render the whole surface of the tread of said tire preferably resilient at, practically, any point, thus enabling the tread to snugly hug the road and yield easily to small inequalities therein, no matter with what point or points upon the tread such inequalities engage or contact.

Other objects of this invention not at this time more particularly enumerated will be clearly understood from the following detailed description of my present invention.
With the various objects of the present invention in view, the said invention consists, primarily, in the novel resilient tire for vehicles hereinafter set forth; and, the invention consists, furthermore, in the novel arrangements and combinations of the several devices and parts, as well as in the details of the construction of the same, all of which will be more fully described in the following specification, and then finally embodied in the clauses of the claim which are appended to and which form an essential part of this specification.

The invention is clearly illustrated in the accompanying drawings, in which:—

Figure 1 is a side view of a vehicle-wheel equipped with my novel construction of resilient tire, a portion of said tire being shown in longitudinal vertical section to illustrate its interior arrangement and the internal construction of its parts. Fig. 2 is a large detail cross-section of said tire, said section being taken on line 2—2 in said Fig. 1; and Fig. 3 is a larger detail plan view of a portion of the tread of my novel resilient tire.

Similar characters of reference are employed in all of the hereinabove described views, to indicate corresponding parts.

Referring now to the several figures of the drawings, the reference-character 1 indicates the hub of a vehicle-wheel from which radiate, in the usual manner, the rim or felly-supporting spokes 2, the free ends of which are connected with a rim or felly 3, in the usual manner. The said rim or felly 3 may be of any desirable form or construction. Arranged upon the outer circumferential surface of said rim or felly 3 is a metallic rim or band 4, the same being provided with a plurality of outwardly projecting seating-lugs or bosses 5, which are spaced and staggered in a suitable manner so as to conform with the positions of the other elements of the tire-construction to be presently more fully described. Secured upon each side of said rim or felly 3, by means of suitable retaining rings 6 and screws 7, or other desirable fastening means, are outwardly extending side-aprons 8. These aprons 8 are preferably made of some flexible material, such as pig-skin, leather, or other suitable fabric or material. Secured respectively to the outer edges of said aprons 8, by means of stitching 9, or any other suitable fastening means, are inwardly extending flanges 10 of an outer casing 11, the said casing being also made of some flexible material, such as pig-skin, leather, or other suitable fabric or material. The said casing 11 is provided with a plurality of perforations 12 extending in rows from side to side of said casing, the perforations of one row being staggered with relation to its adjoining rows, preferably, in the manner shown. Arranged in said plurality of perforations 12 of said casing 11 are the inwardly extending shanks 13 of suitable tread-pins, the outer ends of said tread-pins being provided with heads 14, and the latter being arranged to fit closely with relation to one another. The shanks 13 of said tread-pins fit tightly in the perforations 12 of said casing 11, as no slidable movement of said tread-pins with relation to said casing 11 is desired, the movement of said casing 11 being coincident with the movement of said tread-pins, and the purpose of said tight fit being to make it impossible for dust, dirt, or other foreign matter, to work into the internal parts of said tire. Arranged within said casing 11, and concentric with the said casing and said rim or felly 3, is a spring-band 15, formed, preferably, of a laminated spring-steel construction, comprising a plurality of steel-bands which are closely related, one to the other, and are in concentric arrangement. This said spring-band 15 is provided with a plurality of perforations 16 which correspond in their positions to the positions of the inwardly projecting shanks 13 of said tread-pins, said shanks passing through said perforations 16 and projecting beyond the inner side of said spring-band 15. The said perforations 16 of said spring-band 15 are of larger diameter than the cross-section of said shanks 13 of said tread-pins, so that the latter may be capable of a free movement with relation to said spring-band 15. Arranged upon the inwardly projecting end of the shank 13 of each tread-pin, is a washer-like member 17, the same being tightly and securely wedged upon the said shanks 13, and being adapted to rest normally against the inner side of said spring-band 15. The arrangement of said spring-band 15 with relation to said rim or felly 3 is such that there is provided an intervening space 18 between the said parts. The above mentioned seating-lugs or bosses 5 are arranged and are disposed in such a manner, so as to present themselves opposite the inwardly projecting ends of the shanks 13 of the said tread-pins. Arranged between the ends of the shanks 13 of said tread-pins and the lug or boss opposite thereto is a coiled spring 19, one end thereof being seated upon said boss or lug 5 to retain the same in position, and the other end of the spring being seated around the end of said shank 13 and bearing against the washer-like member 17 connected therewith.

From the foregoing description and from an inspection of the drawings it will be clearly understood, that each tread-pin is capable of an independent vertical movement, said movement being resilient in character owing to the support of the spring 19, as will be clearly evident. The heads 14 of said tread-pins form a tire-tread of such a resilient character that it will hug the road over which it moves and will readily adapt itself to the smallest inequalities in the road-bed without jar; and, in fact, in its contact and action with relation to the road-surface, the tire closely simulates the contact and action of the ordinary pneumatic tire upon the road-surface, a result not attained by the mechanically resilient tires heretofore provided. The spring-band 15 is also supported resiliently, due, first to the pressure of the springs 19, which pressure is transmitted to it through the contact of the tread-pins and the washer-like members 17 when in their normal positions; and, secondly, to the inherent resiliency due to the laminated construction. When, however, such of the tread-pins as are pressed inwardly by contact with the road-surface remove the pressure of the springs 19 from said spring-band 15, the latter at that point tends to straighten or flatten out thus allowing or aiding the tread of the tire to flatten out upon the road-surface to perfectly grip or ride upon the same. There being a considerable portion of the shanks 13 extending between the outer surface of said spring-band and the heads 14 of said tread-pins, the latter are capable of even further inward movement in case a small inequality in the road is met with, in which case the tread-pins coming in contact therewith move farther in, while the tread-pins remain in contact with the general road surface. Thus, it will be clearly understood, that the tire-tread will surround said small inequality, much in the manner of an ordinary pneumatic tire, without jar or other noticeable effect.

In order to prevent lateral displacement of the tire upon the rim or felly 3, the shanks of certain of the centrally disposed tread-pins are lengthened to form elongated shanks 21 which pass through openings 20 in said rim or felly 3, and thence into a chambered portion 22 in certain of the spokes 2 of the wheel, the said elongated shanks 20 being slidably arranged in said chambered portions 22 of said spokes. It will also be clearly seen, that the construction of the tread of my novel tire, owing to the arrangement of the plurality of exposed heads 14 of the tread-pins, is also rendered perfectly anti-skid in its operation, which is an advantage which few, if any of the mechanically resilient tires possess.

I am aware that some changes may be made in the arrangements and combinations of the various devices and parts, as well as in the details of the construction of the same, without departing from the scope of my present invention as described in the foregoing specification, and as defined in the claims which are appended thereto. Hence, I do not limit my invention to the exact arrangements and combinations of the devices and parts as set forth in the said specification, nor do I confine myself to the exact details of the construction of the said parts, as illustrated in the accompanying drawings.

I claim:

1. A resilient tire for vehicles, comprising a plurality of radially disposed coiled springs, a spring-band, and a plurality of tread-pins slidably supported in said spring-band, each tread-pin being engaged by one of said springs to resiliently support the same.

2. A resilient tire for vehicles, comprising a plurality of radially disposed tread-pins, each tread-pin having a head and a shank, a spring-band provided with a plurality of perforations adapted to slidably receive said shanks of said tread-pins, a washer-like member connected with the shank of each tread-pin, a plurality of radially disposed coiled springs, and means for supporting said springs, each spring engaging a tread-pin shank and its washer.

3. A resilient tire for vehicles, comprising a plurality of radially disposed tread-pins, each tread-pin having a head and a shank, a spring-band provided with a plurality of perforations adapted to slidably receive said shanks of said tread-pins, a washer-like member connected with the shank of each tread-pin, a plurality of radially disposed coiled springs, means for supporting said springs, each spring engaging a tread-pin shank and its washer, and a flexible casing adapted to envelop said springs, spring-band and tread-pins, but leaving the heads of said tread-pins exposed above the outer surface of said casing.

4. In a resilient tire for vehicles, the combination with a rim-band, of a plurality of bosses, a plurality of radially disposed coiled springs seated upon said bosses, a laminated spring-band provided with a plurality of perforations, said spring-band being arranged concentrically with relation to said rim-band and providing an intervening space between the same and said rim-band in which said coiled-springs lie, a plurality of tread-pins having head-portions and shanks, the shanks of said tread-pins being slidably arranged in the perforations of said spring-band, a washer-like member on the shank of said tread-pin, said washer-like member resting normally against the inner surfaces of said spring-band, and the outer ends of said coiled springs engaging respectively with the inwardly projecting ends of said tread-pin shanks, substantially as and for the purposes set forth.

5. In a resilient tire for vehicles, the combination with a rim-band, of a plurality of bosses, a plurality of radially disposed coiled springs seated upon said bosses, a laminated spring-band provided with a plurality of perforations, said spring-band being arranged concentrically with relation to said rim-band and providing an intervening space between the same and said rim-band in which said coiled-springs lie, a plurality of tread-pins having head-portions and shanks, the shanks of said tread-pins being slidably arranged in the perforations of said spring-band, a washer-like member on the shank of said tread-pin, said washer-like member resting normally against the inner surface of said spring-band, and the outer ends of said coiled springs engaging respectively with the inwardly projecting ends of said tread-pin shanks, and a flexible casing adapted to envelop said springs, spring-band and tread-pins, but leaving the heads of said tread-pins exposed above the outer surface of said casing.

6. In a resilient tire for vehicles, the combination with a rim-band, of a plurality of bosses, a plurality of radially disposed coiled springs seated upon said bosses, a laminated spring-band provided with a plurality of perforations, said spring-band being arranged concentrically with relation to said rim-band and providing an intervening space between the same and said rim-band in which said coiled-springs lie, a plurality of tread-pins having head-portions and shanks, the shanks of said tread-pins being slidably arranged in the perforations of said spring-band, a washer-like member on the shank of said tread-pin, said washer-like member resting normally against the inner surface of said spring-band, and the outer ends of said coiled springs engaging respectively with the inwardly projecting ends of said tread-pin shanks, and a selected number of said tread-pin shanks being provided with an elongated shank adapted to be slidably arranged in the felly and spokes of a wheel to prevent the lateral displacement of said tire, substantially as and for the purposes set forth.

7. In a resilient tire for vehicles, the combination with a rim-band, of a plurality of bosses, a plurality of radially disposed coiled springs seated upon said bosses, a laminated spring-band provided with a plurality of perforations, said spring-band being arranged concentrically with relation to said rim-band and providing an intervening space between the same and said rim-band in which said coiled-springs lie, a plurality of tread-pins having head-portions and shanks, the shanks of said tread-pins being slidably arranged in the perforations of said spring-band, a washer-like member on the shank of said tread-pin, said washer-like member resting normally against the inner surfaces of said spring-band, and the outer ends of said coiled springs engaging respectively with the inwardly projecting ends of said tread-pin shanks, and a selected number of said tread-pin shanks being provided with an elongated shank adapted to be slidably arranged in the felly and spokes of a wheel to prevent the lateral displacement of said tire, and a flexible casing adapted to envelop said springs, spring-band and tread-pins, but leaving the heads of said tread-pins exposed above the outer surface of said casing.

8. A resilient tire for vehicles, comprising a plurality of radially disposed coiled springs, a spring-band, a plurality of tread-pins slidably supported in said spring-band, each tread-pin being engaged by one of said coiled springs to resiliently support the same, and a selected number of said tread-pins being provided with elongated shanks adapted to be slidably arranged in the felly and spokes of a wheel to prevent a lateral displacement of said tire.

In testimony that I claim the invention set forth above I have hereunto set my hand this second day of April, 1910.

RICHARD REININGER.

Witnesses:
FREDK. C. FRAENTZEL,
FREDK. H. W. FRAENTZEL.